United States Patent
Lingarajappa (10) Patent No.: US 10,459,798 B2
(45) Date of Patent: Oct. 29, 2019

(54) DATA STORAGE SYSTEM WITH MULTIPLE PARITY REDUNDANCY

(71) Applicant: Seagate Technology LLC, Cupertino, CA (US)

(72) Inventor: Chetan Bendakaluru Lingarajappa, Bangalore (IN)

(73) Assignee: Seagate Technology LLC, Cupertino, CA (US)

( * ) Notice: Subject to any disclaimer, the term of this patent is extended or adjusted under 35 U.S.C. 154(b) by 109 days.

(21) Appl. No.: 15/705,452

(22) Filed: Sep. 15, 2017

(65) Prior Publication Data

US 2019/0087272 A1    Mar. 21, 2019

(51) Int. Cl.
G06F 11/10 (2006.01)
G06F 3/06 (2006.01)

(52) U.S. Cl.
CPC .......... *G06F 11/1096* (2013.01); *G06F 3/064* (2013.01); *G06F 3/065* (2013.01); *G06F 3/0607* (2013.01); *G06F 3/0619* (2013.01); *G06F 3/0658* (2013.01); *G06F 3/0665* (2013.01); *G06F 3/0688* (2013.01); *G06F 3/0689* (2013.01)

(58) Field of Classification Search
CPC .. G06F 11/1096; G06F 3/0619; G06F 3/0689; G06F 3/064
See application file for complete search history.

(56) References Cited

U.S. PATENT DOCUMENTS

| | | | |
|---|---|---|---|
| 5,455,593 A | 10/1995 | Ross | |
| 5,506,977 A | 4/1996 | Jones | |
| 5,533,190 A | 7/1996 | Binford et al. | |
| 6,128,762 A * | 10/2000 | Jadav | G06F 11/1076 711/114 |
| 6,826,711 B2 | 11/2004 | Moulton et al. | |
| 6,834,326 B1 | 12/2004 | Wang et al. | |
| 6,959,413 B2 | 10/2005 | Humlicek et al. | |
| 7,185,144 B2 | 2/2007 | Corbett et al. | |
| 8,812,902 B2 | 8/2014 | Deepak | |
| 9,563,509 B2 | 2/2017 | Han et al. | |
| 2008/0250270 A1 * | 10/2008 | Bennett | G06F 11/1068 714/6.13 |

(Continued)

OTHER PUBLICATIONS

S. Narayan and J. A. Chandy, "Parity Redundancy in a Clustered Storage System," Fourth International Workshop on Storage Network Architecture and Parallel I/Os (SNAPI 2007), San Diego, CA, 2007, pp. 17-24.*

(Continued)

*Primary Examiner* — Cynthia Britt
(74) *Attorney, Agent, or Firm* — Hall Estill Attorneys at Law (57) ABSTRACT

A data storage system can have multiple parity redundancy with a plurality of data storage units arranged into logical rows and logical columns. A controller connected to the plurality of data storage units can orchestrate the logical rows storing striped data having at least one rotational parity value and each logical column storing striped data with a static parity value. The static parity value of each logical column may be computed from the at least one rotational parity value of at least one logical row as directed by the controller.

20 Claims, 6 Drawing Sheets

(56) References Cited

U.S. PATENT DOCUMENTS

| | | | | |
|---|---|---|---|---|
| 2008/0276041 A1* | 11/2008 | Hetzler | ................ | G06F 3/0605 |
| | | | | 711/114 |
| 2009/0172244 A1* | 7/2009 | Wang | ................ | G06F 11/1076 |
| | | | | 711/5 |
| 2011/0126045 A1* | 5/2011 | Bennett | ............... | G06F 11/1068 |
| | | | | 714/6.22 |
| 2013/0124776 A1* | 5/2013 | Hallak | ................ | G06F 11/1092 |
| | | | | 711/102 |
| 2013/0304987 A1* | 11/2013 | Goel | ................ | G06F 11/1076 |
| | | | | 711/114 |
| 2016/0350186 A1* | 12/2016 | Blaum | ................ | H03M 13/373 |
| 2017/0168896 A1 | 6/2017 | Karrotu et al. | | |

OTHER PUBLICATIONS

M. Uehara, "Combining N-ary RAID to RAID MP," 2009 International Conference on Network-Based Information Systems, Indianapolis, IN, 2009, pp. 451-456.*

K. H. Yeung and T. S. Yum, "Dynamic multiple parity (DMP) disk array for serial transaction processing," in IEEE Transactions on Computers, vol. 50, No. 9, pp. 949-959, Sep. 2001.*

M. Uehara, "Design and Implementation of Mesh RAID with Multiple Parities in Virtual Large-Scale Disks," 2012 IEEE 26th International Conference on Advanced Information Networking and Applications, Fukuoka, 2012, pp. 67-72.*

* cited by examiner

DATA STORAGE SYSTEM WITH MULTIPLE PARITY REDUNDANCY

SUMMARY OF THE INVENTION

A data storage system, in accordance with some embodiments, has a plurality of data storage units arranged into logical rows and columns. The logical rows stores striped data having rotational parity as directed by a connected controller that also directs the logical columns to store striped data with static parity. The static parity of each logical column is computed from the rotational parity of at least one logical row as directed by the controller Various embodiments arrange a data storage system with a controller connected to a plurality of data storage units. The controller arranges the plurality of data storage units into logical rows and columns and computes a rotational parity value for each logical row with the controller. A static parity value is generated by the controller for each logical column with the static parity value of each logical column computed from the rotational parity value of the logical row in which the static parity value resides.

In other embodiments, a data storage system has a network controller connected to a plurality of data storage units arranged into logical rows and columns. The logical rows store striped data and at least one rotational parity value while the logical columns store striped data with a static parity value. The static parity value of each logical column is computed from the at least one rotational parity value of at least one logical row as directed by the network controller. The static parity value of a first logical column is stored in a first data storage device. The striped data and at least one rotational parity value of the first logical columns is stored in a second storage device with the first storage device having a greater data capacity than the second data storage device.

DETAILED DESCRIPTION

With increased amounts of data being generated, transferred, and stored, data storage systems with large data capacities are in greater demand. The heightened volumes of data correspond with greater amounts of sensitive data that have high retention priority. While existing data storage systems have the specifications to transfer and store large volumes of sensitive data, errors and failures occur, which can place data at risk and degrade system performance as complex and/or lengthy data reconstruction operations are conducted.

Accordingly, various embodiments are directed to a data storage system with multiple parity redundancy that increases the system's resilience to encountered errors and failures. Assorted embodiments of a data storage system further allow for optimized data storage performance with adaptability to changing system conditions, such as the addition or removal of data storage components, and coexisting diverse data storage configurations.

Figure 1:
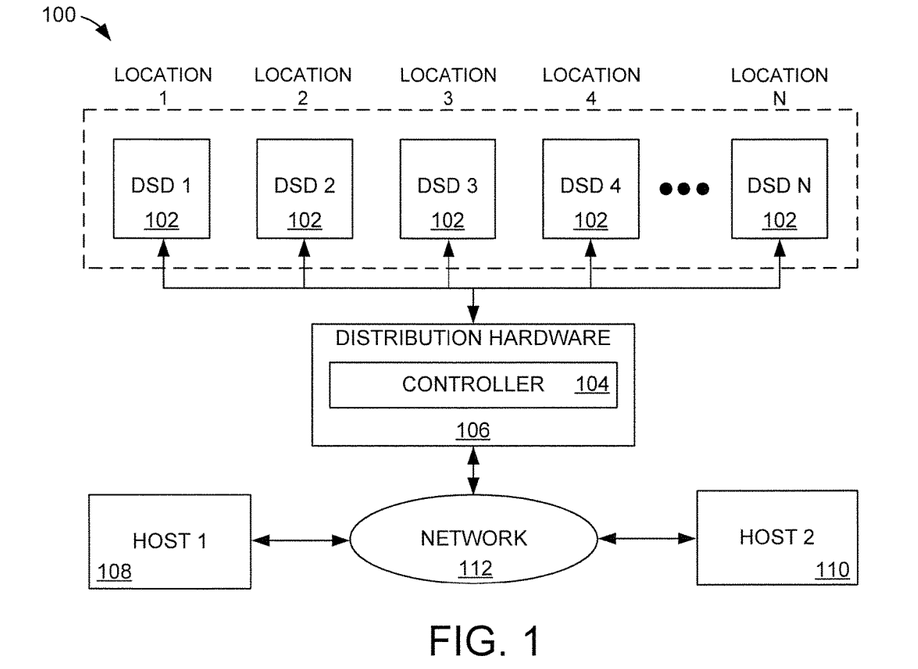
FIG. 1 is a block representation of an example data storage system arranged in accordance with various embodiments.

FIG. 1 is a block representation of an example data storage system 100 where various embodiments can be practiced. The system 100 may be any size and consist of any size number and type of interconnected computing components. In the non-limiting configuration of FIG. 1, a plurality of data storage device 102 (DSD1-N) are each connected to a shared controller 104 resident in distribution hardware 106. The shared controller 104 can direct data storage operations to, and from, the various data storage units 102 to, and from, any number of remote hosts.

Although not required or limiting, the system 100 has first 108 and second 110 remote hosts are physically separate from the distribution hardware 106 while being connected to the shared controller 104 via a wired and/or wireless network 112. The shared controller 104 can treat some, or all, of the data storage devices 102 as a redundant array of independent disks/devices (RAID), as shown by segmented lines 116, with configurations, such as level 0, 4, 5, 6, etc., where data is striped and/or mirrored with or without parity data to provide reliable data storage.

The shared controller 104 can direct the flow of data to, and from, individual data storage devices 102 as well to a group of more than one data storage devices 102 to fulfill pending data access requests, such as data reads and data writes from the hosts 108/110. It is contemplated that the shared controller 104 can also direct data traffic in and among the data storage devices 102 as part of data storage maintenance or security.

It is contemplated, but not required, that the various data storage devices 102 are physically present at different locations, such as different cities, states, countries, continents, or hemispheres, to increase system integrity in view of a unit failure corresponding with geographic location. Different physical locations can also be employed for the distribution hardware 106 and remote hosts 108/110. Hence, each aspect of the data storage system 100 can be located at different, and unique, physical locations.

Figure 2:
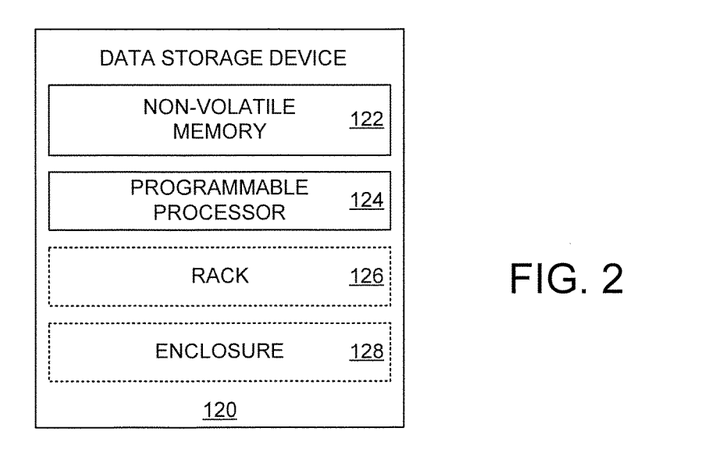
FIG. 2 displays a block representation of a portion of an example data storage system configured in accordance with some embodiments.

FIG. 2 depicts a block representation of an example data storage device 120 arranged in accordance with some embodiments to be utilized in the data storage system 100 of FIG. 1. The data storage unit 120 has at least one non-volatile memory 122 and a local programmable processor 124 that directs data storage, and retrieval, operations in the non-volatile memory 122. The local programmable processor 124 may also conduct operations, such as security or maintenance activity, independently of a network controller, such as the shared controller 104 of FIG. 1.

The data storage unit 120 can be a single data storage device or multiple interconnected devices in close proximity. In some embodiments, a data storage unit 120 consists of one or more data storage racks 126 where at least one data storage enclosure 128 is housed. A data storage enclosure 128 may have numerous separate data storage devices, such as rotating magnetic media, solid-state memory, or combinations of the two, along with power supply and cooling components. A data storage enclosure 128 can be configured to be accessible independent of other enclosures within a rack 126 so that one or more data storage devices can be changed, potentially without taking any other data storage devices or enclosures 128 offline.

Regardless of whether a data storage unit 120 consists of a single data storage device or a plurality of interconnected devices, wired and/or wireless connection between devices at different physical locations can be organized as a RAID with a shared controller directing data storage operations. It is contemplated that a RAID group redundantly stores multiple copies of data, such as three copies, specifically in different physical locations as part of an object storage architecture.

Figure 3:
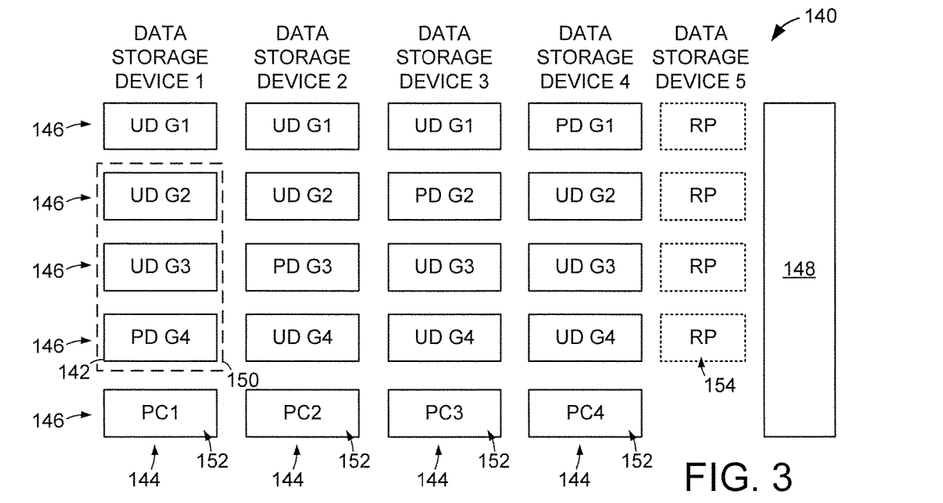
FIG. 3 depicts a block representation of portions of an example data storage system arranged in accordance with assorted embodiments.

FIG. 3 depicts a block representation of portions of an example data storage system 140 where data storage units 142 are arranged logically into columns 144 and rows 146 in accordance with various embodiments. Each column 144 consists of different data storage addresses in one or more data storage units positioned at a single location while each row consists of different data storage addresses in different data storage units positioned at different physical locations.

That is, a column 144 is configured with data destinations in one, or many, data storage units physically positioned in a common location. For instance, a column 144 can be different physical block addresses (PBA) in a single data storage unit, such as different rotating data disks in a hard disk drive data storage unit, or in multiple data storage units, such as different data enclosures, racks, and/or memory arrays.

Hence, each data storage unit 142 of each column 144 shown in FIG. 3 is located at a common physical location while each row 146 has different data storage units 142 distributed across different data storage locations in different physical locations. The logical configuration of the assorted data storage units 142 into columns 144 and rows 146 can be organized and executed with a RAID controller 148 located in the distribution hardware 106 of the data storage system 140 in conjunction with the local programmable processors 124 of the various data storage devices that comprise the system 140.

For clarity, FIG. 3 illustrates how data storage units 142 can be configured into logical columns from one or more data storage devices. Segmented line box 150 conveys how less than all of the data storage units 142 of a column 144 can be part of a common data storage device, such as a hard disk drive or solid-state memory array. However, other all the data storage units 142 may alternatively be part of a common data storage device. The ability to aggregate data storage units 142 from one or more data storage devices into a common logical column 144 allows the RAID controller 148 diversity to form unit 142 configurations to optimize performance regardless of the number, type, and capacity of available data storage devices.

It is noted that no matter the number and physical location of the data storage devices that provide the data storage units 142 and data storage locations, the data capacity and data transfer speed of the respective data storage devices can be similar or dissimilar. Thus, the RAID controller 148 can organize and conduct data storage operations, such as data writes, data reads, data updates, and data moves, in data storage devices that have different data storage characteristics, such as write latency, read latency, and capacity.

The RAID controller 148 can configure the data storage system 140 as a single RAID group where user-generated data (UD) is mirrored or striped with, or without, static or rotational parity data (PD) according to provisioned RAID levels, such as 0, 4, 5, or 6. As shown in FIG. 3, the RAID controller 148 can configure the data storage system 140 with each row 146 being a provisioned RAID group (G1/G2/G3/G4) where a data is distributed according to a selected RAID level.

Despite rotational parity provided by RAID levels 5 and 6, as opposed to static parity provided by RAID level 4, the data storage system 140 can be susceptible to data loss and performance-degrading data reconstruction operations as a result of encountered errors and/or failures concurrently in more than one data storage units 142. Therefore, various embodiments are directed to configuring at least one row 146 of data storage units 142 to store parity data 152 for the data stored in the respective columns 144, as denoted by PC. The column parity values 152 can coexist with one or more parity values stored as part of the row RAID level. That is, each column 144 will have a static column parity value 152 that is a function of user data and parity data stored in the various data storage units 142 of a column 144.

In some embodiments, the column parity values 152 are complemented by static row parity values 154, denoted RP, that are computed by the RAID controller 148 as a function of the user data and parity data stored in a row 146. Regardless of the use of row parity values 154, the use of column parity values 152, along with the one or more parity values of the assorted provisioned RAID groups/rows, provides optimized data redundancy that allows for a more robust data storage system 140 that can withstand concurrent errors/failures in more than two data storage locations 142 without complex erasure coding algorithms that degrade data reconstruction operations.

By combining rotational parity values throughout the various logical rows 146 with the static column parity values 152, the RAID controller 148 can utilize efficient algorithms to retrieve data after an encountered error and/or failure. The combination of rotational parity in the provisioned rows 146 and static column parity 152 also allows the RAID controller 148 to write new data in the system 140 without having to compute and rewrite the rotational parity values of each logical row 146.

The configuration of the data storage system 140 further allows the network controller 148 to add and delete provisioned RAID groups at will. That is, the RAID controller 148 can reorganize the various columns 144 and rows 146 in response to an existing data storage device, or data storage unit, being added or removed. For instance, if some, or all, of a provisioned RAID group (row) is deactivated from the system 140, the controller 148 can respond by assigning orphan data chunks as zero data blocks that won't affect parity computations. As another example, the addition of a data storage device/unit to the data storage system 140 can be handled by the RAID controller 148 by computing new column parity values 152, which is more efficient than computing and implementing new rotational parity for the entire system 140.

The configuration of the data storage system 140 allows each provisioned RAID group (row) to have a different, or similar, number of RAID stripes. In other words, the RAID controller 148 can implement different numbers of data storage locations in different data storage devices/units within a provisioned RAID group with any missing data chunks being considered as zero data for computation of the column parity values 152. In the event a data storage device/unit fails, the RAID controller 148 can utilize one or more spare data storage locations to reconstruct the data from the failed location(s).

It is contemplated that if ample spare data capacity is not available for data reconstruction, the RAID controller 148 can utilize portions of the column parity data locations for data reconstruction. Hence, assorted embodiments arrange the data storage devices/units assigned to the column parity values 152 to have a larger data capacity than the data storage devices/units that make up the respective provisioned RAID groups. For clarity, the data storage devices/ units of the provisioned RAID groups can have different data capacities, which is accommodated by the network controller 148 assigning any unused data blocks/chunks as zeros that will not affect column parity value 152 computation speed or accuracy.

The availability of the data storage devices/units where the column parity values 154 are stored provides auxiliary data locations to the RAID controller 148 to be used on a need basis. As a non-limiting example, the controller 148 can utilize a data storage device to store column parity values 152 until a device failure elsewhere in the logical column 144 triggers the column parity values to be overwritten with provisioned column data. The ability to adapt to changing system 140 conditions as well as encountered errors/failures by commissioning column parity value storage locations provides efficient system 140 management that maintains data storage performance and can be quickly reconstructed by simply recomputing column parity values 152 once the provisioned RAID group data location are repaired or replaced.

The use of at least the column parity values 152 can optimize data storage performance for the system 140 by allowing parallel data reconstruction from within a column 144 and/or within a row 146. The RAID controller 148 may proactively evaluate the computing time and overhead corresponding with data reconstruction after an encountered error/failure and select either column-based reconstruction or row-based reconstruction to provide the least data storage performance impact on the system 140.

It is contemplated that the RAID controller 148 can concurrently manage multiple different RAID levels being present in the respective provisioned RAID groups, which correspond with the logical rows 146. As such, a first row may be RAID level 4 while a second row is RAID level 6. While non-parity RAID levels (0, 1, 2) can be utilized in the data storage system 140, various embodiments have each logical row 146 with at least one parity value that is rotated to different logical columns 144 to distribute the system parity values and provide "rotational parity."

Figure 4:
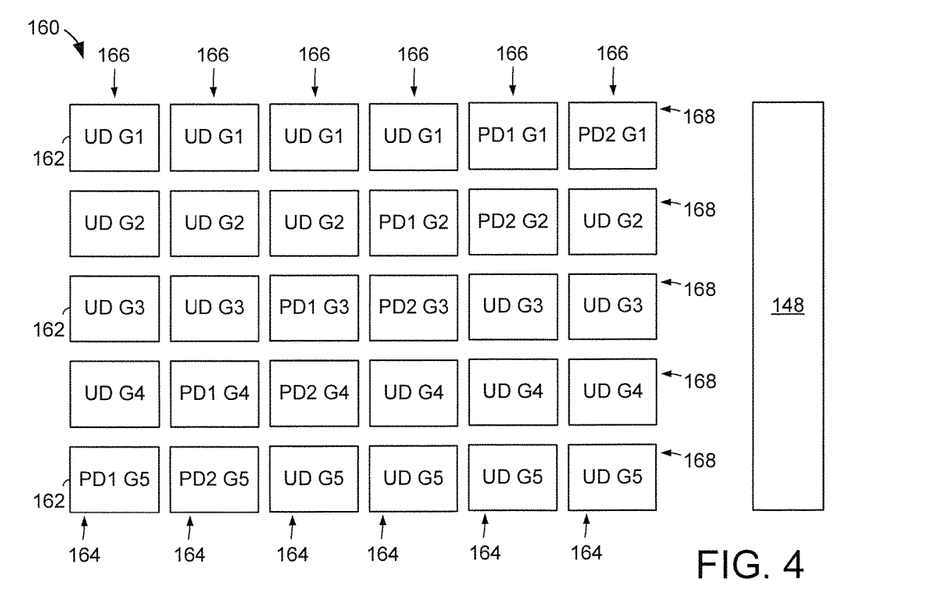
FIG. 4 illustrates a block representation of a portion of an example data storage system configured and operated in accordance with various embodiments.

FIG. 4 is a block representation of a portion of an example RAID group 160 where data storage units 162 are distributed across multiple separate and different physical locations and data storage devices in a manner similar to the devices 102 of FIG. 1. One or more RAID controllers 148 can be concurrently, or individually, active to conduct data storage operations to, from, and within the various data storage units.

In the non-limiting embodiment of FIG. 4, each logical column 164 corresponds to a single data storage device 166, such as a hard disk drive (HDD), solid-state memory array, or hybrid arrangement of rotating and solid-state memory. Hence, each data storage device 166 contains multiple data storage units 162 that can be individually accessed by the RAID controller 148. The logical rows 168 of the RAID group 160 correspond with at least one data storage unit 162 in each data storage device 166.

As shown, the respective data storage units 162 are data receptacles for either user-generated data (UD) or parity data (PD) that are provisioned by the RAID controller 148 into a level 6 configuration where two different parity computations are stored for each distribution of four user-generated data portions. It is noted that the location of the parity data is deliberately rotated to different data storage devices 166 so that each logical column 164 has at least one unit 162 filled with parity data.

With six different data storage devices 166 each having five different storage units 162, the data storage system 160 can be characterized as a 6×5 RAID group storing five different data groups, as designated by G1, G2, G3, G4, and G5 that each comprise user-generated data as well as different first (PD1) and second (PD2) parity computations for the data group. Therefore, a data storage unit 162 designated as UD G2 in FIG. 4 has a portion of user-generated data for the second data group and a unit 162 designated as PD2 G3 stores a second parity computation for the third data group.

Figure 5:
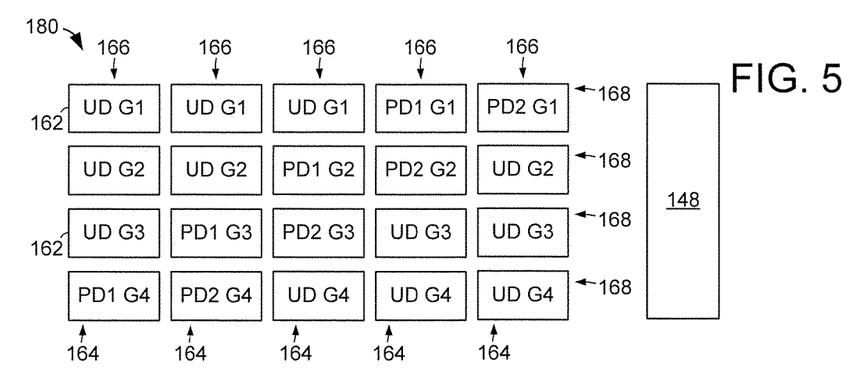
FIG. 5 conveys a block representation of a portion of an example data storage system in accordance with some embodiments.

FIG. 5 displays a block representation of an example RAID group 180 that may be employed alone, or in combination with the group 160 of FIG. 4, in accordance with various embodiments. FIGS. 4-9 will each use common reference values for assorted aspects, but such designation does not require the aspects to be the same. For instance, data storage devices in different data storage systems can be designated as reference value 166, but the respective devices may be different types of memory, have different data capacities, and be in different physical locations.

In the RAID group 180 of FIG. 5, five different data storage devices 166 each have four data storage units 162. The RAID controller 148 distributes data according to a level six provision, much like with the data of system 160, where two different parity computations are utilized for each data group and are rotated to the different data storage devices 166 of the RAID group 180. However, due to the lower number of data storage devices 166 and units 162 in each column 164, the RAID controller 148 can distribute data as three portions instead of the four portions in RAID group 160.

Despite the different arrangements, the RAID groups 160 and 180 can provide level 6 provisioning. In yet, combining the RAID groups 160 and 180 into a single collective RAID array would be difficult due to the different numbers of data storage units 162 and data storage devices 166. That is, combination of the RAID groups 160 and 180, as shown in FIGS. 4 & 5, would result in unused data storage units 162 that may increase data storage complexity, increase data reconstruction time in response to an error/failure, and degrade data storage performance.

Figure 6:
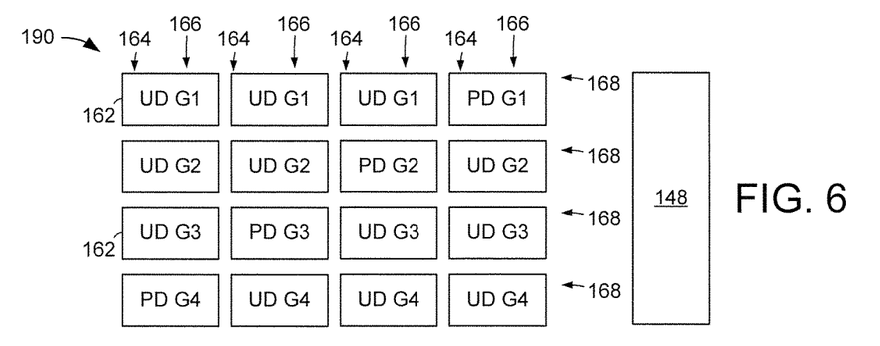
FIG. 6 shows a block representation of a portion of an example data storage system arranged in accordance with various embodiments.

FIG. 6 is a block representation of another example RAID group 190 that may be combined with the RAID groups 160/180 in accordance with various embodiments. The RAID group 190 has four data storage devices 166 each with four data storage units 162. The sixteen total data storage units 162 are provisioned by the RAID controller 148 as a level 5 with a single parity computation for each data group rotated amongst the different data storage devices 166.

Figure 7:
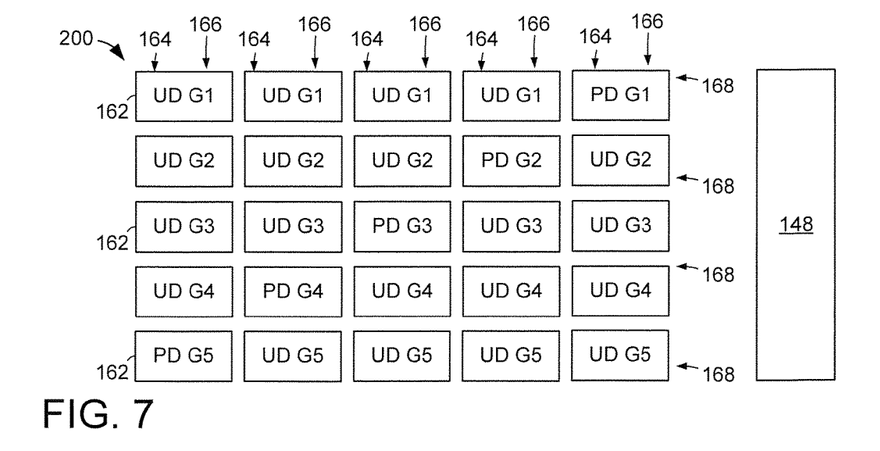
FIG. 7 displays a block representation of a portion of an example data storage system configured in accordance with assorted embodiments.

The example RAID group 200 of FIG. 7 conveys how level 5 RAID provisioning can also be utilized with five data storage devices 166 each having five data storage units 162 by splitting data into four portions. Hence, the RAID controller 148 can provide rotational parity with diverse numbers of data storage devices 166 and data storage units 162 in those devices 166. However, it is contemplated that the various data storage units 162 and devices 166 of FIGS. 4-7 are of a common data size. The introduction of a data storage unit 162, or device 166, with a different data size than other devices 166 or units 162 of the logical columns 164 and rows 168 adds complexity to data storage, retrieval, and maintenance.

Figure 8:
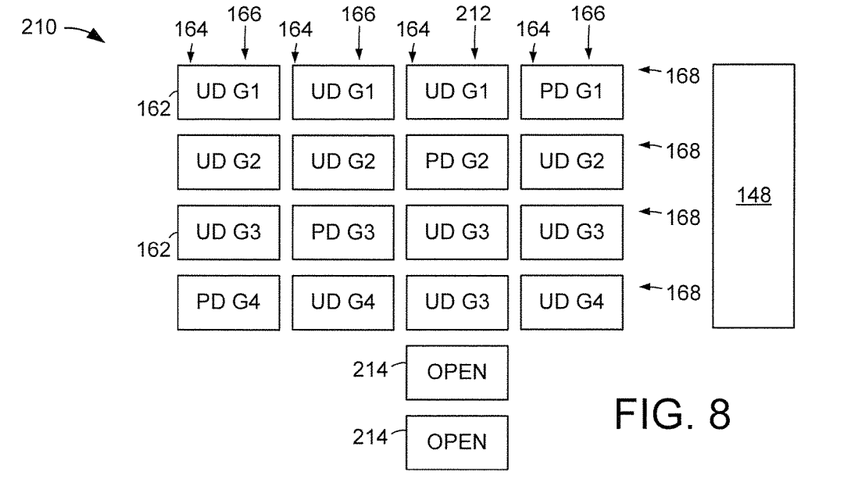
FIG. 8 illustrates a block representation of a portion of an example data storage system in accordance with some embodiments.

FIG. 8 illustrates a block representation of an example RAID group 210 with a data storage device 212 having a greater data storage capacity and number of data storage units 162 than the other data storage devices 166 that make up the group 210. The RAID controller 148 can provide level 6 provisioning, as shown, but two unused data units 214 would be ignored.

Although one or more of the data storage devices 166/212 may be formatted to be the same data capacity, such activity is time consuming and complex due at least to the reconstruction of the data of the entire system 210. In yet, the loss of extra data storage capacity is also detrimental to the data storage RAID group 210 by leaving potentially large volumes of data storage unutilized. Thus, it can be appreciated from the RAID groups 160/180/190/200/210 of FIGS. 4-8 that dissimilar group configurations can be difficult to collectively utilize as a single collective data storage system. However, practical usage of a different data storage devices 166 in different physical locations often result in dissimilar RAID group configurations that must be remediated or accommodated by the RAID controller 148.

Figure 9:
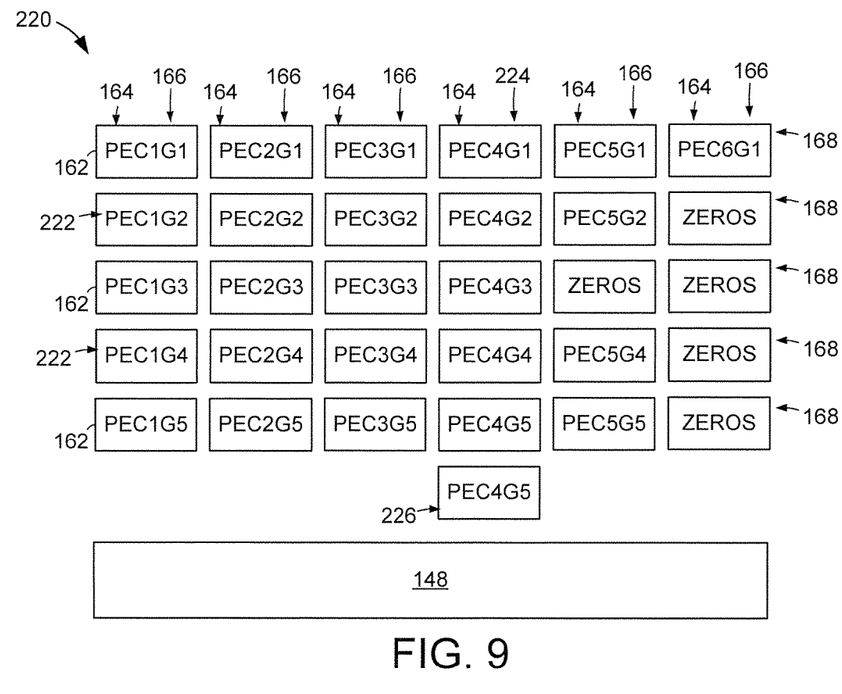
FIG. 9 is a block representation of a portion of an example data storage system capable of being used in conjunction with the systems of FIGS. 1-8

Accordingly, embodiments are directed to providing a parity RAID group that can be utilized in combination with the RAID controller and one or more of the RAID groups of FIGS. 4-8 to provide a data storage system with optimized versatility and adaptability. FIG. 9 is a block representation of an example parity RAID group 220 where six different data storage devices 166 are distributed across different physical locations each with at least five data storage units 162. It is noted that each data storage device 166 of the parity RAID group 220 is configured with a greater data capacity than the devices 166 of the user-generated data containing RAID groups 160/180/190/200/210 so that the parity device 166 can provide parity protection to unused portions of the RAID groups.

Although not required, each data storage device 166 is assigned to multiple different RAID groups, such as groups 160/180/190/200/210. As such, a parity entry 222 (PE) is a parity computation from the user-generated or parity value stored in the corresponding unit location in the RAID group. As such, a PEC1G1 entry is a parity computation for column one of RAID group 1 and PEC2G2 is the parity computation for column two of RAID group 2.

In some embodiments, each parity entry 222 corresponds with the common logical row and column position of data in multiple different RAID groups. For instance, the user-generated data located in the first row 168 and first column 164 of each RAID group can be computed as a single parity entry 222 and arranged by the RAID controller 148 in to the corresponding logical row and column position in the parity group 220. Therefore, the parity group 220 can have level 4 provisioning that equates to a static parity computation from data located in one RAID group or across many different RAID groups.

Expanding the example configuration, the parity entry 222 at the second column 164 and first row 168 is a parity computation of the data stored in the respective units 162 of the various RAID groups at the second column 164 and first row 168. As a result, a data storage system that combines the RAID groups of FIGS. 4-8 with the parity RAID group of FIG. 9 will have both rotational parity within the respective RAID groups and a static parity provided by the parity RAID group. The combination of rotational and static parity computations allows the system to efficiently reconstruct user-generated data in the event of an error or failure. Also, the multiple parity computations make the collective data storage system more robust to multiple failures, such as 2 concurrent failures within a RAID group.

The use of a dedicated parity RAID group 220 can further allow for increased adaptability to changing system conditions as well as RAID groups having dissimilar configurations, such as data capacity and provisioned RAID levels. A non-limiting embodiment is shown with a parity data storage device 224 having an extra parity entry 226 compared to the other parity data storage devices. The extra parity entry 226 can accommodate a larger RAID group data storage device 166, such as data storage device 212 of FIG. 8, by providing parity protection. In the event the extra units 162 of the larger RAID group data storage device 212 are unused, the RAID controller 148 can substitute zero values until user-generated data, or parity data derived from user-generated data, is stored in the extra units 162.

Figure 10:
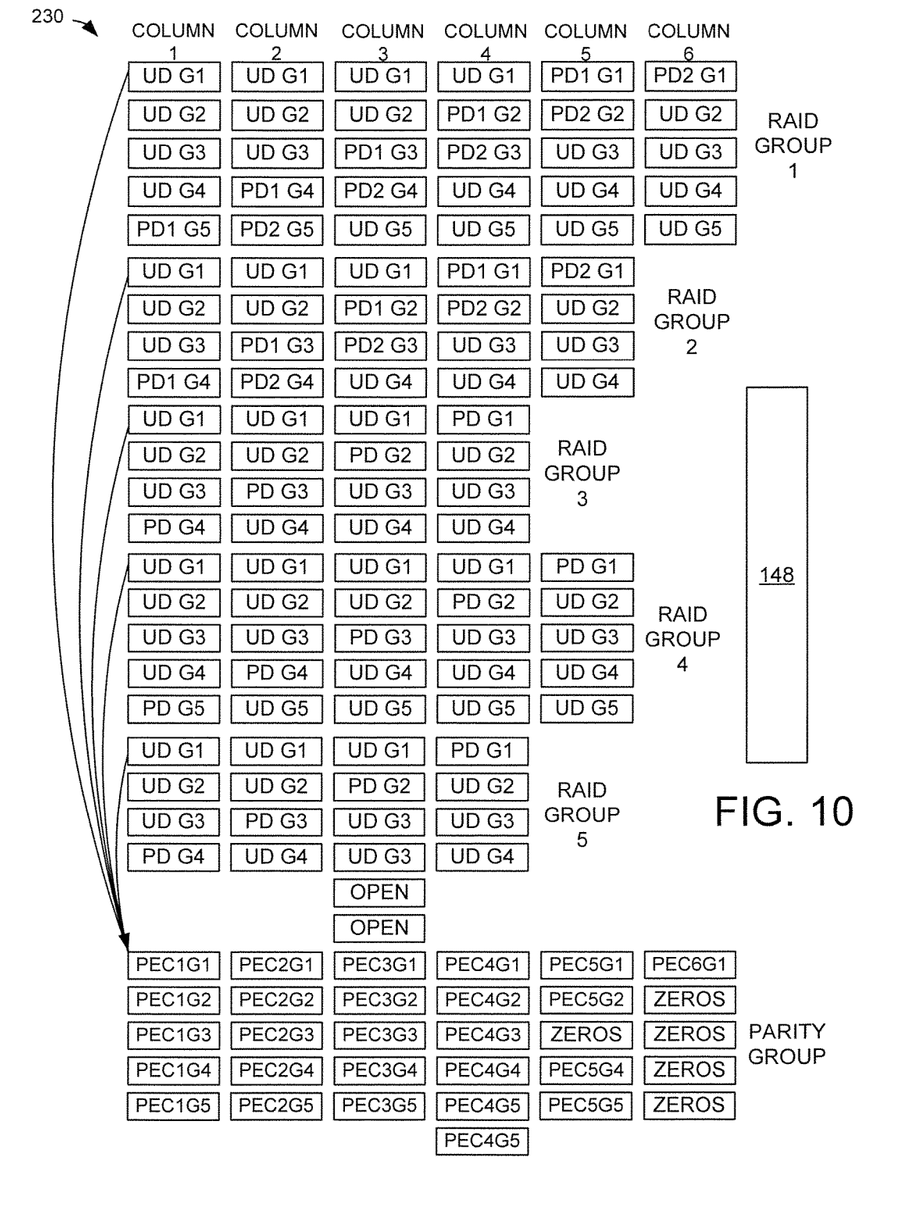
FIG. 10 depicts a block representation of a portion of an example data storage system employing the systems of FIGS. 4-9.

FIG. 10 represents an example data storage system 230 consisting of the example RAID groups 160/180/190/200/210 of FIGS. 4-8 along with the parity RAID group 220 of FIG. 9. The block representation of the conglomeration of the various RAID groups conveys how the RAID controller 148 can provide optimized data parity redundancy for groups of different sizes and provisioned levels.

With the first RAID group 160 having six devices 166 and no other group having more than five devices 166, the RAID controller 148 can mirror data from other units 162 or insert zero values to provide parity protection for the data stored in the device 166 corresponding to the sixth column 164 of the first RAID group 160. The placeholding of mirror or zero data in the sixth column 164 of the system 230, the RAID controller 148 can efficiently adapt to the addition of a new devices, data groups, data capacity, and/or RAID groups to the system 230.

In the example configuration shown in FIG. 10, it can be appreciated that the RAID controller 148 can organize and correlate data of the various RAID groups with the parity entries 222 in a diverse variety of manners, without limitation. The ability to selectively insert zero values, mirror data, and alter static parity entry 222 assignments allows the RAID controller to accurately and quickly create multiple parity computations as well as recover data lost to an encountered error or failure.

Figure 11:
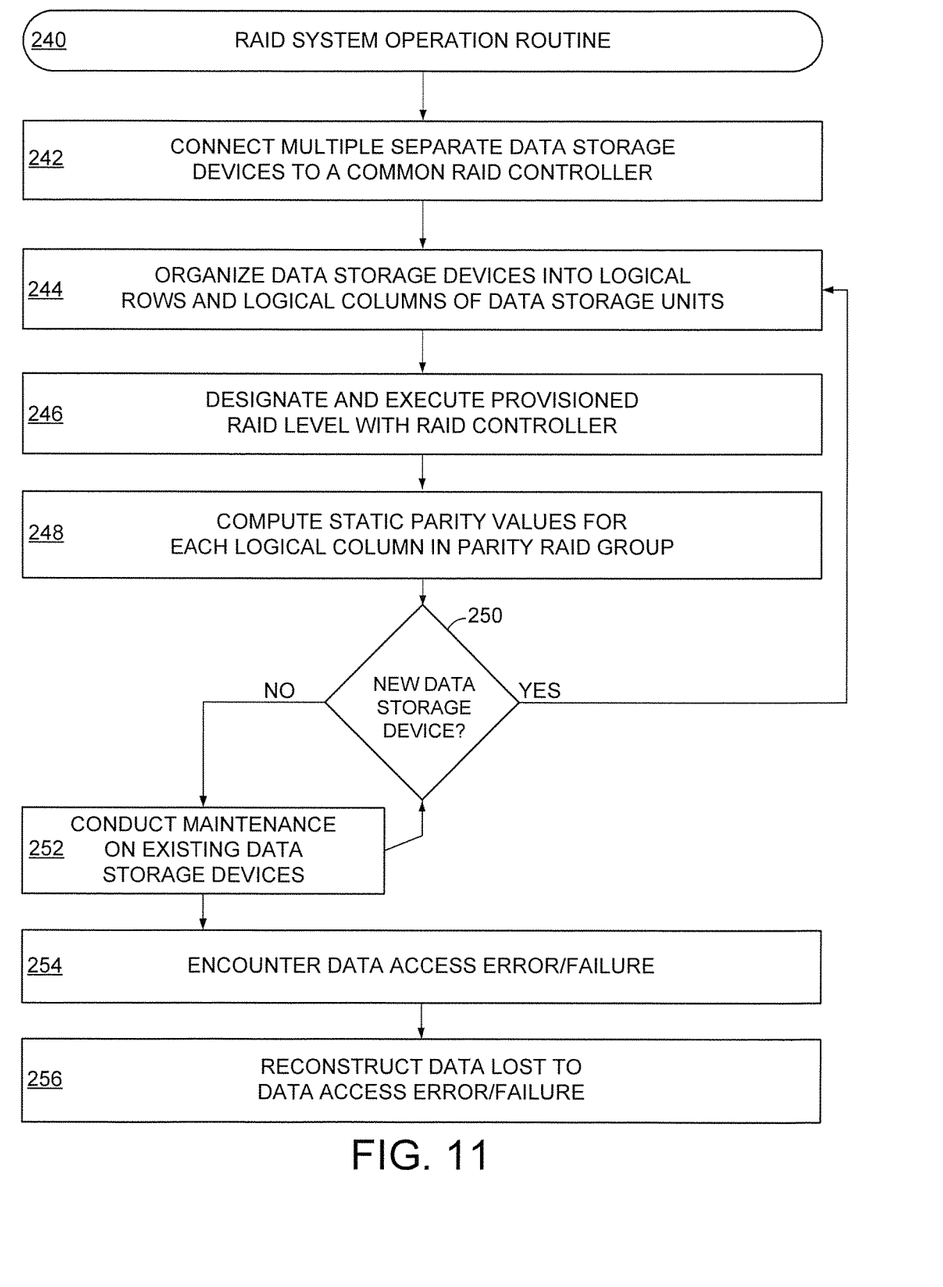
FIG. 11 provides a flowchart of an example RAID system operation routine that can be carried out by the data storage system of FIGS. 1-10.

FIG. 11 depicts a flowchart of an example RAID system operation routine 240 that can be carried out by a data storage system comprising any number of aspects from FIGS. 1-10. The routine 240 can begin with step 242 connecting multiple separate data storage devices positioned in different physical locations to a common RAID controller. The RAID controller can then organize the various data storage devices into at least one RAID group with logical columns and rows in step 244.

Next, a provisioned RAID level designated by the RAID controller is carried out with the distribution of data and computation of at least one parity value in step 246. It is contemplated, but not required, that step 244 and 246 distribute parity values across the data storage devices of the RAID group in accordance with level 5 or 6 provisioning. The RAID controller proceeds to compute a static parity value for each logical column in step 248 before storing the static parity computations in a separate parity RAID group. It is noted that the static parity computations can have a different provisioned level, such as level 4, compared to the RAID group and can involve the rotational parity computations stored in data storage units of the RAID group.

Although a single RAID group may be utilized in routine 240, decision 250 continuously, or sporadically, tests for added data storage devices. If no data storage device is added, step 252 conducts maintenance operations, such as archiving, garbage collection, and cache clearing. In the event one or more data storage devices are added to the system, decision 250 returns to step 244 where the new data storage devices are integrated into the existing RAID group or configured into a different RAID group. The addition of RAID groups can accommodate different data storage device sizes and speeds as well as different numbers of RAID group columns and rows.

The ability for the RAID controller to set different RAID groups to different provisioned RAID levels allows data storage units to be treated differently within the system, which can provide different data storage characteristics for different data. For instance, a RAID group storing archival data may be designated with a higher provisioned level than a RAID group storing frequently accessed (hot) data. As such, the RAID controller can configure RAID groups in a hierarchical structure with different provisioned levels, all while having increased parity protection provided by the redundant parity computations within the RAID group and within the parity RAID group.

At any time after formation of at least one RAID group protected by a parity RAID group, step 252 can encounter an error and/or failure that triggers the RAID controller to reconstruct the lost data in step 254. The presence of the redundant parity computations in the parity RAID group allows step 254 to take less time than if the parity of the RAID group alone was used to reconstruct the lost data.

Through the various embodiments of the present disclosure, a RAID controller can provide redundant parity computations that increase the protection of data without degrading data storage performance. The use of static parity computations in combination with rotational parity computations allows for efficient adaptation of a data storage system to changing conditions, such as errors, failures, newly added data storage devices, and removed data storage devices. The ability to adapt to data storage devices of a system having different data capacities further conveys how a RAID controller can optimize data storage by utilizing a static parity RAID group.

What is claimed is:

1. A system comprising a controller connected to a plurality of data storage units arranged into logical rows and columns, the logical rows storing striped data having at least one rotational parity value, each logical column storing striped data with a static parity value, the static parity value of each logical column computed from the at least one rotational parity value of at least one logical row as directed by the controller, at least one data storage unit of the plurality of data storage units having a zero value assigned by the controller responsive to a data storage device being newly connected to the controller.

2. The system of claim 1, wherein the striped data and at least one rotational parity value of each logical column are stored in different and physically separated data storage devices.

3. The system of claim 1, wherein each logical row corresponds with multiple different and physically separated data storage devices.

4. The system of claim 3, wherein each data storage device each unit comprises a local programmable processor and memory.

5. The system of claim 1, wherein the controller sets each logical row to different provisioned level.

6. The system of claim 5, wherein the controller sets each logical column to a common provisioned level.

7. The system of claim 1, wherein the striped data is user-generated data.

8. The system of claim 1, wherein the logical rows are provisioned to a redundant array of independent devices (RAID) level 6 and the logical columns are provisioned to a RAID level 4.

9. The system of claim 1, wherein each logical row and logical column has more than one parity computation.

10. A method comprising:
connecting a controller to a plurality of data storage units;
arranging the plurality of data storage units into logical rows and columns, each logical row and logical column storing striped data;
computing a rotational parity value for each logical row with the controller;
generating a static parity value for each logical column with the controller, the static parity value of each logical column computed from the rotational parity value of the logical row in which the static parity value resides, the static parity value of a first logical column of the plurality of logical columns stored in a first data storage unit of the plurality of data storage units, the striped data and at least one rotational parity value of the first logical columns stored in a second storage device, the first storage device having a greater data capacity than the second data storage device.

11. The method of claim 10, wherein the controller assigns a zero value to a data storage unit responsive to a data storage device being removed from the controller.

12. The method of claim 10, wherein the controller assigns a zero value to a data storage unit responsive to a data storage device being newly connected to the controller.

13. The method of claim 10, wherein the controller assigns a zero value to a data storage unit responsive to a first data storage device having a different data capacity than a second data storage device, each data storage device connected to the controller and forming portions of the logical rows and columns.

14. The method of claim 10, wherein the controller reconstructs at least one data storage unit responsive to an encountered data storage error.

15. The method of claim 14, wherein the controller reconstructs the at least one data storage unit from the static parity value of the logical column.

16. The method of claim 15, wherein the controller evaluates reconstructing the at least one data storage unit from the rotational parity value of the logical row and uses the static parity value instead of the rotational parity value.

17. The method of claim 10, wherein the controller changes a first logical row from a first provisioned level to a second provisioned level without taking any other logical rows offline.

18. The method of claim 10, wherein the controller stores user-generated data to a logical row and logical column while two data storage units are non-operational in response to encountered failures.

19. A system comprising a network controller connected to a plurality of data storage units arranged into logical rows and columns, the logical rows storing striped data and at least one rotational parity value, the logical columns storing striped data with a static parity value, the static parity value of each logical column computed from the at least one rotational parity value of at least one logical row as directed by the network controller, the static parity value of a first logical column stored in a first data storage device, the striped data and at least one rotational parity value of the first logical columns stored in a second storage device, the first storage device having a greater data capacity than the second data storage device.

20. The system of claim 19, wherein each logical column has a different data storage device storing the static parity value than the striped data and at least one rotational parity value.

* * * * *